United States Patent

Saenger et al.

[15] 3,700,875

[45] Oct. 24, 1972

[54] PARALLEL BINARY CARRY LOOK-AHEAD ADDER SYSTEM

[72] Inventors: Franz Saenger; Dieter Straub, both of Konstanz, Germany

[73] Assignee: Licentia Patent-Verwaltungs-G.m.b.H., Frankfurt am Main, Germany

[22] Filed: Feb. 18, 1971

[21] Appl. No.: 116,585

[30] Foreign Application Priority Data

Feb. 18, 1970 Germany..........P 20 07 353.4

[52] U.S. Cl...............................................235/175

[51] Int. Cl...............................................G06f 7/50

[58] Field of Search......................................235/175

[56] References Cited

UNITED STATES PATENTS

| | | | |
|---|---|---|---|
| 2,966,305 | 12/1960 | Rosenberger | 235/175 |
| 3,056,551 | 10/1962 | Heijn et al. | 235/175 |
| 3,105,897 | 10/1963 | Heijn | 235/175 |
| 3,202,806 | 8/1965 | Menne | 235/175 |

OTHER PUBLICATIONS

M. S. Schmookler, Group-Carry Generator IBM Technical Disclosure Bulletin, Vol. 6, No. 1, June 1963, pp. 77–78.

M. Schmookler, Threshold Carry Look-Ahead for Parallel Binary Adder IBM Tech. Disclosure Bulletin, Nov., 1964, pp. 451–452.

Flores, The Logic of Computer Arithmetic, 1963, pp. 83–88.

*Primary Examiner*—Charles E. Atkinson
*Assistant Examiner*—David H. Malzahn
*Attorney*—Spencer & Kaye

[57] ABSTRACT

A multiple bit binary parallel adder system including a plurality of multiple bit group parallel adders with the output carry from the highest-bit of each group adder constituting the input carry of the next highest order group adder. The output carry of the highest order bit of each group adder is rapidly formed by means of logic switching circuits which compile values corresponding to all of the input values to the group adder while the remaining output carries within the group adders are formed as conventional propogated carries.

4 Claims, 7 Drawing Figures

(PRIOR ART)

PARALLEL BINARY CARRY LOOK-AHEAD ADDER SYSTEM

BACKGROUND OF THE INVENTION

The present invention relates to an improved multiple bit binary parallel adder system. More particularly, the present invention relates to a multiple bit binary adder system which contains multiple bit group adders wherein the output carry from the highest order bit of a group adder constitutes the input carry of the lowest order bit of the next-higher order group adder.

Multiple bit binary adder systems are known in which all the carries in the group adders, which each comprise a plurality of bit full adders, are formed rapidly and possibly even simultaneously so that, on the one hand, the output carry from one group adder which is fed to the next-higher order group adder is formed rapidly while, on the other hand, the individual sum bits of the group adder are quickly available. Such systems however, are generally rather complex or expensive in that they require a substantial quantity of additional circuitry.

SUMMARY OF THE INVENTION

It is therefore the object of the present invention to simplify the formation of the carries in the above-mentioned type of multiple bit adders without however reducing the calculating speed to any appreciable degree.

The above object is achieved according to the present invention in that the output carry from at least one group adder is rapidly formed, in a known manner, by means of logic switching circuits by compiling all of the input values of the group adder either directly or by intermediate values which are derived from the input values, while the other carries of the group adder are formed as propagating carries, i.e., the output carries of each of the full adders of the group adder is formed in the conventional manner for parallel adders in that the output carry of each full adder is the input carry of the next-higher order bit adder so that the carry is propagated along the adder chain.

According to a feature of the invention the logic circuits utilized to form the output carry of the group adder are of the type disclosed in U.S. Pat. No. 3,504,192 issued Mar. 31, 1970 to Herbert Stopper which have at least one first input (A1, A2, . . .) and at least one second input (B1, B2, . . .) and which link the input values fed to these inputs to form the following output values:

$$C = A1 + A2 + \ldots + \overline{B1 + B2 + \ldots}$$
$$\overline{C} = \overline{A1 + A2 + \ldots} \cdot (B1 + B2 + \ldots)$$

According to a further feature of the invention the entire multiple bit adder system may be formed from the above-mentioned logic circuits.

DESCRIPTION OF THE PREFERRED EMBODIMENTS

A logic circuit which links input values A and B into output values $C = A + \overline{B}$ and $\overline{C} = \overline{A} \cdot B$, where the input value A can be replaced by the disjunctively linked values A1, A2 . . . and the input value B by the disjunctively linked values B1, B2 so that the above-mentioned logic linkage equations result is disclosed in above-mentioned U.S. Pat. No. 3,504,192. The logic circuit diagram of such a circuit having at least four inputs A1, A2, B1, B2 is shown in FIG. 1*a*.

Figure 1A:
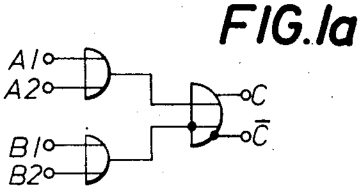
FIG. 1*a* is a block circuit diagram of a basic logic circuit employed in the circuits according to the invention.
Figure 1B:
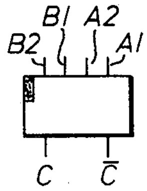
(PRIOR ART) FIG. 1b
FIG. 1*b* is a simplified symbolic representation for the logic circuit according to FIG. 1*a*.

FIG. 1*b* shows a simplified symbol for the circuit shown in FIG. 1*a* which will be employed in illustrating circuits according to the present invention.

Figure 2:
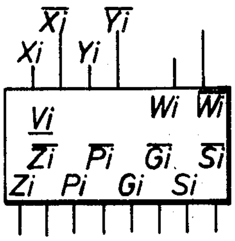
(PRIOR ART) FIG. 2
FIG. 2 is a simplified symbolic representation for a binary full adder as it is used in explaining the present invention.

FIG. 2 illustrates a symbolic representation of a full adder $V_i$ as it is employed in the explanation of the present invention which serves to add the *i*th bit or digit $X_i$, $Y_i$ of two summands. The full adder $V_i$ has inputs $X_i$, $\overline{X}_i$, $Y_i$, $\overline{Y}_i$, to which are fed the normal and complementary values of the synonymous summands, respectively, as well as inputs $W_i$ and $\overline{W}_i$ to which is fed, if applicable, the output carry $Z_{i-1}$ and its complement value $\overline{Z_{i-1}}$ of the previous (lower-bit) adder stage. The full adder $V_i$ also has outputs $Z_i$ and $\overline{Z}_i$ for the carry and its complementary value, respectively, outputs $S_i$ and $\overline{S}_i$ for the sum of the inputs $X_i$, $Y_i$ and for its complement, respectively, an output for $P_i = X_i + Y_i$, an output $G_i = X_i \cdot Y_i$, and outputs $\overline{P}_i$ and $\overline{G}_i$ for the respective complementary values. The plus sign (+) here indicates, as in the remainder of the specification, the logic OR function, while the multiplication sign (·) indicates, as in the remainder of the specification, the logic AND function. The full adders $V_i$ may be constructed in any desired manner so long as they alone or with the presence of additional logic circuitry provide the above-mentioned outputs.

Figure 3:
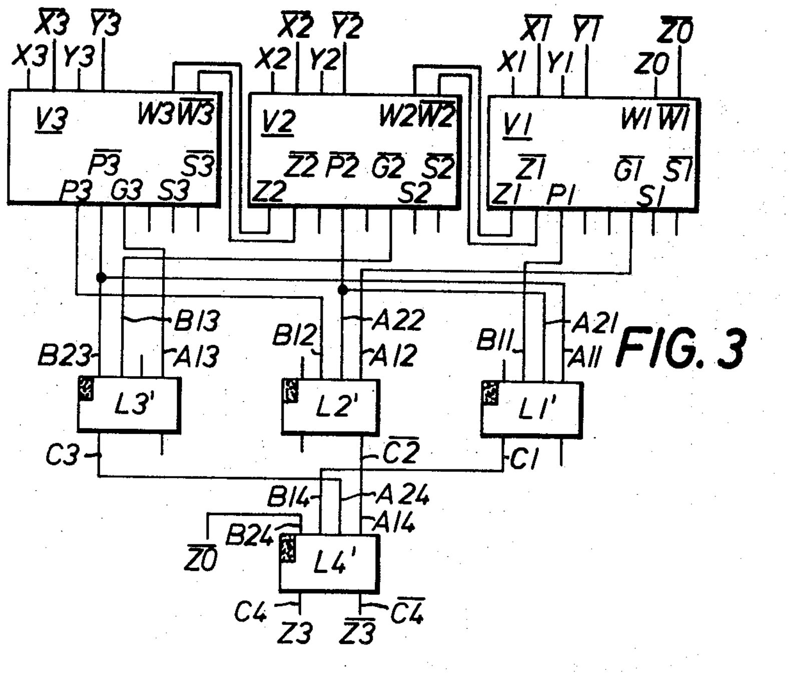
FIG. 3 is a block circuit diagram of a three-bit group adder according to the invention.

Referring now to FIG. 3, there is shown an embodiment of the present invention for a three-bit group adder. The group adder is composed of three full adders $V_1$, $V_2$, and $V_3$, to which are fed as inputs three consecutive bits of two summands, in accordance with their bit positions, i.e., $X_1$, $X_2$, $X_3$, $Y_1$, $Y_2$, $Y_3$, respectively, as well as possibly an input carry $Z_{i-1}$, i.e., $Z_0$ and the corresponding complementary values of all of these inputs. The output carry $Z_1$, $\overline{Z}_1$ of the lowest-bit full adder $V_1$, in the conventional manner for parallel binary full adders, forms the input carry for the full adder $V_2$, while the output carry $Z_2$, $\overline{Z}_2$ of the full adder $V_2$ forms the input carry of the full adder $V_3$. Thus, these carries are formed by propagation along the adder chain. However, according to the invention, the full adder $V_3$ does not itself form an output carry but rather this output carry is rapidly formed by means of four logic circuits L1′ to L4′, each identical with the circuit of FIGS. 1*a* and 1*b*, from the input carry $Z_0$ and a number of auxiliary values P and G or the corresponding complementary values which are furnished by the individual full adders. The output carry $Z_3$, $\overline{Z_3}$ appears at the outputs C4 and $\overline{C4}$ of logic circuits L4′. The inputs $W_1$, $\overline{W_1}$ of the first full adder $V_1$ receive the input carry which, if the group adder according to FIG. 3 is not the lowest bit group adder of a multiple bit adder, is formed by the output carry of the next-lower order group adder. In the same manner the carry $Z_3$, $\overline{Z_3}$ formed by logic circuit L4′ forms the input carry for a possibly provided next-higher order group adder.

The connection of the logic circuits with one another and the association of the input values and output values with the inputs A1$\mu$, A2$\mu$, B1$\mu$, B2$\mu$, where $\mu$ = 1 . . . 4 and corresponds to the logic circuit reference number, and outputs C$\mu$, and $\overline{C\mu}$ is as follows:

| L1′ | L2′ | L3′ | L4′ |
|---|---|---|---|
| A11 = $\overline{P_3}$<br>A21 = $\overline{P_2}$<br>B11 = $P_1$ | A12 = $\overline{G_1}$<br>A22 = $\overline{P_2}$<br>B12 = $P_3$ | A13 = $G_3$<br><br>B13 = $\overline{G_2}$<br>B23 = $\overline{P_3}$ | A14 = $\overline{C2}$<br>A24 = C3<br>B14 = C1<br>B24 = $\overline{Z_0}$<br>C4 = $Z_3$<br>C4 = $\overline{Z_3}$ |

The travel times for the carry in several multiple bit adder systems according to the invention will now be considered. Each of the systems to be considered includes a plurality of group adders according to FIG. 3 which are interconnected so that the output carry (corresponding to $Z_3$) of one group adder forms the input carry (corresponding to $Z_0$) of the next-higher order group adder. A nine-bit adder then consists of three group adders, a 15-bit adder consists of five group adders, an 18-bit adder consists of six group adders, etc. A 16-bit adder may consist of five three-bit group adders as shown in FIG. 3 and an additional full adder for the highest order digit.

Figure 5:
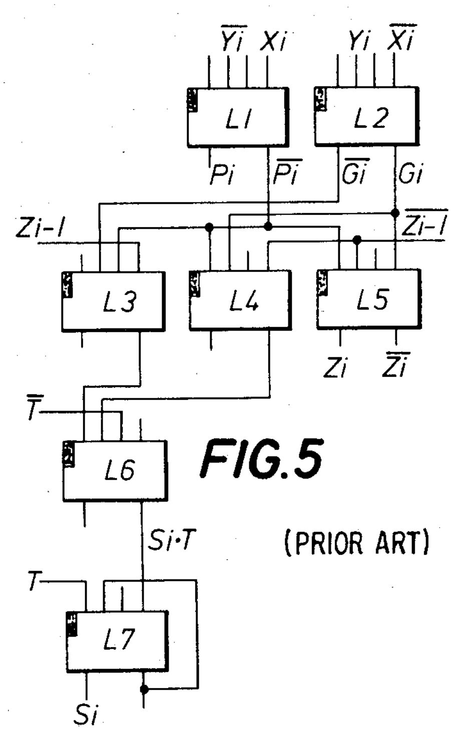
FIG. 5 (PRIOR ART)
FIG. 5 is a block circuit diagram of a full adder comprising logic circuits as shown in FIGS. 1*a* and 1*b*, which may be utilized in the circuits of the present invention.

If the travel time or time delay of a logic circuit, e.g., L1′, is given the reference value 1, and if the full adders $V_1$–$V_3$ are also formed of such logic circuits, e.g., as shown in FIG. 5 which will be discussed below, or employ circuitry such that the same travel times are exhibited, the following travel times result for the carries of the respective highest bit of an adder system having 3, 6, 9, 12, 15, 16, or 18 digits, counted from the moment when the summand is present:

| | $Z_3$ | $Z_6$ | $Z_9$ | $Z_{12}$ | $Z_{15}$ | $Z_{16}$ | $Z_{18}$ |
|---|---|---|---|---|---|---|---|
| Travel time | 3 | 4 | 5 | 6 | 7 | 8 | 8 |

If the carries of all bits of the individual group adders were rapidly formed in a known manner by logic switching circuits, the travel time of the carry of the highest bit would not be reduced, but the time for forming the sums of a particular group adder would be shortened. It may, therefore, be advantageous to quickly form all of the carries in the highest-bit group adder so that the formation of the sum locations of the highest-bit adder occurs rapidly whereby the total result of the addition would be available more quickly.

With the arrangement shown in FIG. 3, the complementary input carry $\overline{Z_0}$ must pass through only a single logic circuit (L4′) before the output carry $Z_3$ is formed. Thus, each group adder of a multi-bit system adder, with the exception of the lowest-bit adder, effects only a delay of the carry by one travel time, thus shortening the time required for the entire adder system to form a correct total sum. This delay of one travel time per group adder applies if it is assumed that all summand bits are present at the adder at the same instant of time.

Figure 4:
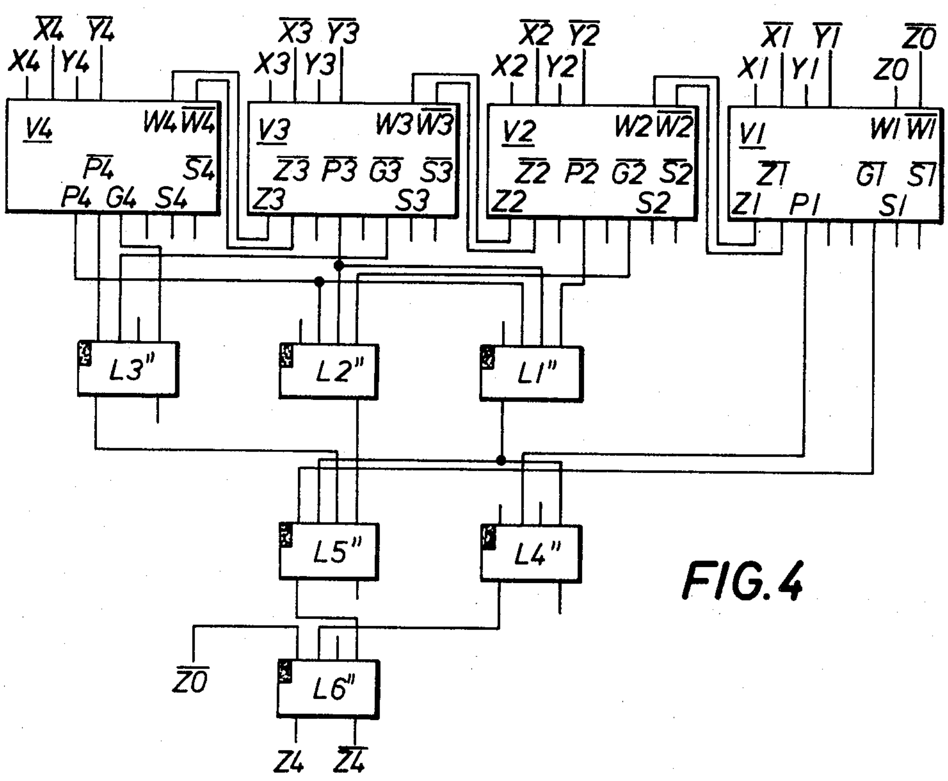
FIG. 4 is a block circuit diagram of a four-bit group adder according to the invention.

FIG. 4 shows a further example of a group adder according to the present invention which is suited for building a multiple-bit binary adder. The group adder of FIG. 4 is composed of four full adders $V_1$ to $V_4$. Again, as in a conventional parallel binary adder, the carries within the group adder are treated as circulating or propagating carries. According to the invention, however, carry $Z_4$ of the highest order bit is rapidly formed with logic circuits. For the rapid formation of the carry $Z_4$ six logic circuits L1″ to L6″ are provided. Their mutual linkage and the association of input values and output values to the inputs A1$\mu$, A2$\mu$, B1$\mu$, B2$\mu$, where $\mu$ = 1, 2, 3 . . . 6, and outputs C$\mu$ and $\overline{C\mu}$ being effected in the following manner:

| L1″ | L2″ | L3″ |
|---|---|---|
| A11 = $\overline{P_2}$<br>A21 = $\overline{P_3}$<br>B11 = $P_4$ | A12 = $\overline{G_2}$<br>A22 = $\overline{P_3}$<br>B12 = $P_4$ | A13 = $G_4$<br><br>B13 = $\overline{G_3}$<br>B23 = $\overline{P_4}$ |
| **L4″** | **L5″** | **L6″** |
| A14 = C1<br><br>B14 = $P_1$ | A15 = $\overline{C2}$<br>A25 = C3<br>B15 = C1<br>B25 = $\overline{C_1}$ | A16 = C5<br><br>B16 = C4<br>B26 = $\overline{Z_0}$<br>C6 = $Z_4$<br>C6 = $\overline{Z_4}$ |

If multiple digit adder systems having 4, 8, 12, 16, or 20 bits are formed according to the invention with the aid of the group adders according to FIG. 4, and again making the same assumptions and using the same definitions as used with respect to FIG. 3, the following travel times result for the carries of each of the highest bits:

| | $Z_4$ | $Z_8$ | $Z_{12}$ | $Z_{16}$ | $Z_{20}$ |
|---|---|---|---|---|---|
| Travel time | 4 | 5 | 6 | 7 | 8 |

As with the FIG. 3 embodiment, in the group adder of FIG. 4 the input carry $\overline{Z_0}$ also passes through only a single logic circuit (L6″) until the output carry $Z_4$ is formed.

FIG. 5 shows a logic diagram for a full adder which can be advantageously used to build a system of group adders according to the present invention. This full adder is more fully described and claimed in copending U.S. patent application Ser. No. 89,859 filed Nov. 16, 1970 by Dieter Straub and assigned to the same assignee as the present application. The full adder is composed of seven logic circuits L1 to L7 according FIG. 1, with their interconnection and association of input values and output values being effected in the following manner:

| | | | |
|---|---|---|---|
| L1: $A11 = X_i$ | $B11 = \overline{Y_i}$ | | |
| L2: $A12 = \overline{X_i}$ | $B12 = Y_i$ | | |
| L3: $A13 = Z_{i-1}$ | $B13 = C2$ | $A23 = \overline{C1}$ | |
| L4: $A14 = \overline{Z_{i-1}}$ | $B14 = \overline{C2}$ | | $B24 = \overline{C1}$ |
| L5: $A15 = \overline{C2}$ | $B15 = \overline{Z_{i-1}}$ | | $B25 = \overline{C1}$ |
| L6: | $B16 = \overline{C4}$ | | $B26 = \overline{C3}$ |

$Z_i = C5$; $\overline{Z_i} = \overline{C5}$; $S_i = \overline{C6}$; $\overline{S_i} = C6$ The above table does not consider the logic circuit L7 and the fact that in FIG. 5 a negated clock pulse signal $\overline{T}$ is fed to input A26. Logic circuit L7 is provided so as to realize, in a known manner, an element exhibiting memory behavior which, during a clock pulse T, takes the value of $S_i$ from logic circuit L6 and makes this value of $S_i$ or $\overline{S_i}$, respectively available at its outputs during the interval following the clock pulse.

The advantage of the just described full adder of FIG. 5 is that it directly furnishes the auxiliary values P, G and their compliments rapidly from the carry. These auxiliary values could, of course, also be formed by logic circuits which are not a part of a full adder circuit.

FIGS. 3 and 4 indicate that the full adder for the highest order bit of the group adder system, i.e., $V_3$ or $V_4$, respectively, need not have its own outputs for the carry, i.e., $Z_3$ or $Z_4$, respectively. Consequently, under certain circumstances, these full adders could be designed somewhat simpler than the other full adders of group adders. Additionally, in the full adder shown in FIG. 5 the logic circuit L5 could be eliminated for each highest-bit full adder $V_i$.

In FIGS. 3, 4, and 5 some inputs of the logic circuits illustrated therein are not indicated as receiving a signal. This means that these inputs are to continuously have a signal applied thereto with the logic value 0. Depending on the type of switching system employed, this would be accomplished either by applying a specific voltage to these nonoccupied inputs or by leaving these inputs unconnected.

Figure 6:
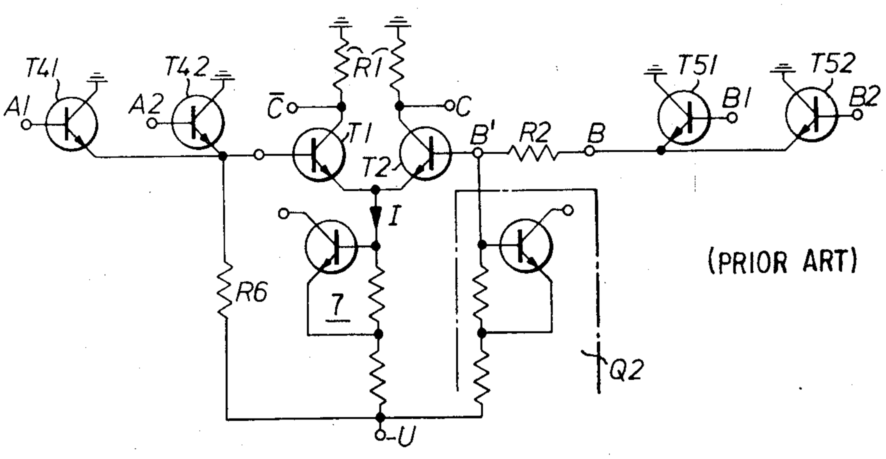
FIG. 6 is a schematic diagram of a practical embodiment of the logic circuit of FIG. 1*a* which per se is known.

The specific circuit design for the logic circuits can take different forms. One configuration which is advantageous is disclosed in U.S. Pat. No. 3,504,192 and illustrated in FIG. 6. As shown in FIG. 6 each logic circuit includes two transistors $T_1$, $T_2$ which are connected in a current transferring manner with their emitters connected together and via a current source 7, with the one pole of a supply voltage source providing a voltage U. The collector resistors $R_1$ of the transistors $T_1$ and $T_2$ are connected with the other pole of the supply voltage source. Connected in series with the control circuit of one transistor ($T_2$) is a voltage source having a lower voltage than the voltage rise or swing of the control signals, i.e., the voltage rise between the logic values 0 and 1. Preferably the voltage provided by the series connected voltage source has a value of one-half the control signal voltage rise. The voltage source connected in series with the control circuit of transistor $T_2$ is represented in FIG. 6 by a resistor $R_2$ and a current source circuit $Q_2$ which permits current to flow through resistor $R_2$ in such a way that the desired voltage drop is produced therein. The inputs of the circuit of FIG. 6 are marked A1, A2, B1, B2, and the outputs of the circuit are C, $\overline{C}$. A more detailed description of this circuit will be found in U.S. Pat. No. 3,504,192.

Advantageously, a plurality of all of the logic circuits required to build a group adder system may be accommodated in a single integrated circuit. Additionally, as can easily be seen, it is quite possible to provide, instead of the logic circuits which each have four inputs, logic circuits for the individual bits of the group adder system which have exactly the required number of inputs.

It will be understood that the above description of the present invention is susceptible to various modifications, changes and adaptations, and the same are intended to be comprehended within the meaning and range of equivalents of the appended claims.

We claim:

1. In a multiple bit binary parallel adder system for adding together the bits of two binary words, said system containing a plurality of multiple bit group parallel adders and wherein the output carry from the highest order bit of each group adder constitutes the input carry for the lowest order bit of the next-higher order group adder, the improvement wherein at least one of said group adders comprises: a plurality of full adders $V_i$, where i is a number which represents the bit location in the words, each of said full adder $V_i$ having inputs $X_i$, $Y_i$ for summands of the same designation, an input $W_i$ for the output carry $Z_{i-1}$ of the next-lower order bit, an output $S_i$ for the sum of the bits and output $Z_i$ for the output carry; a plurality of logic stages connected to the summand inputs for forming the values $G_i = X_i \cdot Y_i$, $P_i = X_i + Y_i$, and $\overline{G_i}$, $\overline{P_i}$ for the corresponding complementary values; and, logic circuit means for rapidly forming the output carry of said at least one group adder by compiling values corresponding to all of the input values to said at least one group adder, while all of the other carries within said at least one group adder are formed as propagated carriers, said logic circuit means including a plurality of logic circuits $L\mu$ where $\mu = 1, 2, \ldots m$, each of said logic circuits having at least one first input $A1\mu$, $A2\mu \ldots$, at least one second input $B1\mu$, $B2\mu \ldots$, outputs $C\mu$ and $\overline{C\mu}$, and means inter-connecting said first and second inputs and said outputs for establishing the following relationships, $$C\mu = A1\mu + A2\mu + \ldots + \overline{B1\mu + B2\mu + \ldots}$$

$$\overline{C\mu} = \overline{A1\mu + A2\mu + \ldots}\,(B1\mu + B2\mu \ldots).$$

2. A binary adder system as defined in claim 1 wherein said full adders include said logic stages which form the values $P_i$, $\overline{P_i}$, $G_i$, and $\overline{G_i}$.

3. A binary adder system as defined in claim 1 wherein said plurality of multiple bit group adders comprises a plurality of three-bit group adders, each of said three-bit group adders including three of said full adders $V_1$, $V_2$ and $V_3$ and four of said logic circuits L1, L2, L3, and L4, the interconnection of the full adders and logic circuits of each three-bit group adder with one another and the association of input values and output values of each three-bit group adder with the inputs and outputs thereof being as follows:

| $V_1$ | | $V_2$ | $V_3$ |
|---|---|---|---|
| $X_1$ | | $X_2$ | $X_3$ |
| $Y_1$ | | $Y_2$ | $Y_3$ |
| $W_1 = Z_0$ | | $W_2 = Z_1$ | $W_3 = Z_2$ |
| $A11 = \overline{P_3}$ | | $A12 = \overline{G_1}$ | $A13 = G_3$ |
| $A21 = \overline{P_2}$ | | $A22 = \overline{P_2}$ | |
| $B11 = P_1$ | | $B12 = P_3$ | $B13 = \overline{G_2}$ |
| | | | $B23 = \overline{P_3}$ |
| $A14 = \overline{C2}$ | | | |
| $A24 = C3$ | | | |
| $B14 = C1$ | | | |
| $B24 = \overline{Z_0}$ | | | |
| $Z_3 = C4$; | $\overline{Z_3} = \overline{C4}$ | | |

4. A binary adder system as defined in claim 1 wherein said plurality of multiple-bit group adders comprises a plurality of four-bit group adders, each of said four-bit group adders including four full adders $V_1$, $V_2$, $V_3$, and $V_4$ and six logic circuits L1, L2, L3, L4, L5 and L6, the interconnection of the full adders and logic circuits of each four-bit group adders with one another and the association of input values and output values of each four-bit group adder with the inputs and outputs thereof being as follows:

| $V_1$ | $V_2$ | | $V_3$ | $V_4$ |
|---|---|---|---|---|
| $X_1$ | $X_2$ | | $X_3$ | $X_4$ |
| $Y_1$ | $Y_2$ | | $Y_3$ | $Y_4$ |
| $W_1 = Z_0$ | $W_2 = Z_1$ | | $W_3 = Z_2$ | $W_4 = Z_3$ |
| $A11 = \overline{P_2}$ | | $A12 = \overline{G_2}$ | | $A13 = G_4$ |
| $A21 = \overline{P_3}$ | | $A22 = \overline{P_3}$ | | |
| $B11 = P_4$ | | $B12 = P_4$ | | $B13 = \overline{G_3}$ |
| | | | | $B23 = \overline{P_4}$ |
| $A14 = C1$ | | $A15 = \overline{C2}$ | | |
| | | $A25 = C3$ | | |
| $B14 = P_1$ | | $B15 = C1$ | | |
| | | $B25 = \overline{G_1}$ | | |
| $A16 = C5$ | | | | |
| $B16 = C4$ | | | | |
| $B26 = \overline{Z_0}$ | | | | |
| $Z_4 = C6$, $\overline{Z_4} = \overline{C6}$ | | | | |

* * * * *